UNITED STATES PATENT OFFICE 3,094,562
Patented June 18, 1963

3,094,562
PROCESS FOR THE PREPARATION OF
AMINE-BORANE COMPLEXES
Eugene C. Ashby, Baton Rouge, La., assignor to Ethyl Corporation, New York, N.Y., a corporation of Virginia
No Drawing. Filed Apr. 6, 1959, Ser. No. 804,077
7 Claims. (Cl. 260—583)

The present invention relates to the preparation of hydrides of boron, particularly amine-borane complexes, which are readily convertible to diborane.

There are various techniques known in the literature for producing certain hydrides of boron. For example, it has been known to produce diborane by the hydrolysis of magnesium boride, reaction of a boron halide and hydrogen in a glow discharge under vacuum, reaction of a metal hydride such as lithium hydride with boron trifluoride, and the reaction of an alkali metal borohydride with a boron halide. These procedures suffer particular disadvantages. For example, deriving diborane from magnesium boride results in low yields, the lithium hydride process is objectionable because of the high cost of lithium and because the reaction is prone to sudden surges of gas unless a heel of a previous reaction mixture is maintained, and the borohydride process, although more efficient than the above processes, suffers disadvantage in that the borohydride is costly and a part of the boron is utilized in the formation of undesired by-products, e.g. alkali metal boron halides.

Another process which is reported is the reaction of a boron halide with certain metals, including aluminum, and hydrogen, note U.S. Patent 2,469,879. This procedure has not been employed upon a commercial scale and likewise suffers particular disadvantages. For example, although diborane is produced there is no selectivity to result in the principal formation of this compound. That is, it is prepared in admixture with various haloboron hydrides. Although some of the latter compounds will decompose to result in diborane, boron trihalide also results so that a considerable proportion of the boron added for reaction is not consumed in forming the desired product. Likewise, in addition to the formation of diborane a great amount of higher boron hydrides, e.g. tetraborane, pentaborane and the like are also formed. Although these latter products are of some utility, their separation into the respective individual boron hydride fractions is not readily achieved. A still further disadvantage of the process is that it is a vapor phase reaction requiring high temperatures and the yield of diborane obtained is low. Generally speaking, the process results in a 50 percent yield of all of the aforementioned and other products. Of this yield only about ⅕ constitutes diborane. Likewise, as is the case in the lithium hydride and borohydride processes, the costly boron halide is employed and the halogen is wasted. Another major problem in the process is that the aluminum chloride by-product coats the aluminum causing incomplete reaction of the aluminum metal.

Accordingly, it is desirable to provide an improved process for the preparation of boron hydrides, especially diborane, which are useful as reducing materials, for reaction with olefins to produce organoboron compounds or, in particular, for high energy fuel applications.

An object of this invention is to provide a novel process for the preparation of hydrides of boron. A particular object is to provide a process for the preparation of boron hydrides in high yields and higher purity than heretofore available. A still further object is to provide amine-boron hydride complexes, particularly amine-borane, in high yield and purity and selectively. These and other objects will be apparent as the discussion proceeds.

The above and other objects of this invention are accomplished by reacting a boron halide with aluminum metal and hydrogen in the presence of a tertiary amine. The reaction is generally conducted at a temperature above 100° C., but for reasons which will be brought forth hereinafter, is preferably conducted at a temperature between about 180 to 220° C. Boron trichloride is the preferred boron halide and tertiary alkyl amines having up to and including eight carbon atoms, in each alkyl radical, especially triethylamine, are preferred. Aluminum metal which has been activated is a preferable form of this reactant. The boron halide complexes with the amine, and in a preferred operation between about 5 to 15 moles of the amine per mole of the boron halide are employed. The reaction is generally conducted at pressures above atmospheric but best results are obtained at hydrogen pressures between about 2000 to 7500 pounds per square inch (p.s.i.). Thus, a particularly preferred embodiment of this invention comprises the reaction of boron trichloride with finely divided, activated aluminum and hydrogen in the presence of at least sufficient triethylamine to complex with the boron trichloride with the reaction being conducted at a temperature between about 180 to 220° C. and pressure between about 2000 to 7500 p.s.i.

The present process has many advantages over the prior art. One such advantage is that a more selective production of boron hydride product is obtained, the primary product being solely boron hydride-tertiary amine complex, e.g. the tertiary-amine-borane complex $(BH_3 \cdot NR_3)$. The process consistently results in yields of the amine-borane complex above 60 percent and usually above 80 percent. Additionally, a method is provided whereby essentially no formation of haloboron hydrides is obtained nor are any higher boron hydrides obtained, such as pentaborane, decaborane and the like. Further, a method is provided for the selective production of amine-monohalo boron dihydride and amine-dihalo boron hydride.

The tertiary amines employed in the process of this invention serve many functions. One purpose is to form a complex with the boron halide and another purpose is to provide a liquid reaction system. The amine complexes with boron halides are more easily reduced than the uncomplexed materials. Further, such do not form higher boron hydrides nor higher boron halides. Therefore, among the criteria of the tertiary amines is that they form a stable complex with diborane, preferably at room temperature, to result in the amine-borane complex $(BH_3 \cdot NR_3)$. They likewise should be liquid under the reaction conditions employed. Included among the tertiary amines are, for example, amines such as trimethyl, triethyl, trioctyl, trioctadecyl and the like amines, tricyclopentyl amine, tricyclohexyl amine, triphenyl amine, tribenzyl amine, dimethyl aniline and heterocyclic amines such as methyl pyridine, pyridine and the like. Thus, in general, such amines will have up to and including about 18 carbon atoms in the hydrocarbon portions. The above is given merely as illustration and other examples will be evident. It is to be understood that branch chains and other isomers are included and that the hydrocarbon portions can be substituted with functional groups provided such are essentially inert to the reagents and desired product. The saturated and aromatic tertiary amines are advantageous because of their complexing ability and lesser tendency toward side reactions. The alkyl amines, particularly trialkyl amines having up to and including about 8 carbon atoms in each alkyl group are particularly preferred. Among this group, triethylamine has been found to be especially advantageous.

The boron halide can be, for example, the fluorides, iodides, bromides, chlorides or mixed boron halides. The trihalides are particularly preferred, especially boron trichloride. As mentioned above, the boron halide complexes with the tertiary amine. It is to be understood that such complexes need not be pre-prepared for use in the process, but can be obtained in the process, for example, by merely mixing the boron halide with the tertiary amine.

The aluminum metal employed is preferably in a finely divided state. Generally the major dimension of such is below about ¼". Examples of such material are aluminum dust, shavings, and powder. Such forms of aluminum are readily obtained by mechanical means, including grinding, or chemical means, as by reduction of the metal from its ore. For best results, the metal should be activated by some means including, for example, recycle of excess aluminum from a previous reaction; mechanical activation, such as grinding or shaving aluminum under an inert solvent; "Cimmac" aluminum; or chemically treated aluminum such as that treated with an alkyl aluminum compound, preferably triethylaluminum, and hydrogen, at about 120 to 140° C. and 500 to 1500 p.s.i., then filtered from the reaction mixture. Preferred forms of acitvated aluminum are aluminum which has been recycled from a previous reaction mixture and aluminum which has been treated with an alkyl aluminum compound and hydrogen as described above.

It is not necessary that the hydrogen employed be pure and, in general, commercially available sources of hydrogen are applicable. However, contaminants which are reactive in the system should be kept to a minimum as below about 5/10 percent. It is preferable to employ hydrogen which is essentially free of carbon monoxide.

The proportions of the reactants are not critical since reduction is obtained, at least in part, when the boron halide, amine, aluminum, and hydrogen are reacted in varying proportions under the designated conditions. It is desirable, however, to approach stoichiometric reaction and achieve at least a complete complexing of the amine with the boron halide. Therefore, it is convenient to base the amount of the reactants and amine upon the boron halide. Thus, in general, at least a sufficient quantity of the amine is employed to complex with the boron halide. An advantage is achieved when two moles of the amine for every mole of the boron halide are employed so that the aluminum halide by-product will likewise be complexed with amine. Further advantage is achieved when solvent quantities of the amine are employed, as, for example, amounts up to about 20 moles. For best results, it has been found that between about 5 to 15 moles of amine per mole of the boron halide should be employed. The aluminum is generally used in at least the stoichiometric amount in order to achieve complete reduction to the amine-borane. In order to achieve faster reaction rates, it is preferred to employ between about 10 to 100 percent excess of the aluminum. Such excesses are readily recovered and recycled for further reaction. The hydrogen is generally maintained as an atmosphere in the system at pressures above atmospheric for best operation. Pressures as high as 20,000 p.s.i. and higher can be employed although it has been found that best results with economical operation are obtained at pressures between 2000 and 7500 p.s.i.

The temperature at which the reaction is conducted is important. In general, temperatures above 100° C. but below the decomposition temperature of the product, e.g. about 250° C., are employed. However, at temperatures lower than 180° C., while borane amine product is obtained, there is also obtained some incomplete reduction to result in haloboron hydride-amines which are less desirable for the primary purposes of this invention. For example, it has been found that at temperatures between about 100 to 160° C. one obtains predominantly partially reduced products, i.e. amine-dihaloboron hydride and amine-haloboron dihydride. Therefore, in order to obtain essentially complete reduction to the amine-borane, temperatures above 180° C. are employed and temperatures between 180 and 220° C. are preferred in order to both achieve complete reduction and minimize decomposition of the product.

While it is convenient to employ, as a solvent, an excess of the tertiary amine over that required to complex with the boron halide, in many instances more economical operation is obtainable by employing other organic solvents for this purpose. That is, the boron halide-tertiary amine complex can be preformed or sufficient tertiary amine is added to the reaction system to form the boron halide-amine complex, and then an organic solvent of the type described hereinafter can be added for dissolving purposes. The general criteria for such solvents are that they be liquid under the reaction conditions, essentially inert in the reaction, and readily recoverable from the reaction system. Among such solvents are the organic hydrocarbons and ethers. Typical examples of such materials include the hexanes, nonanes, decanes, benzene, toluene, xylene, various mineral oils, gasoline, diesel fuel, catalytically cracked naphtha, dimethyl ether, diethyl ether, dibutyl ether, diamyl ether, methyl ethyl ether, dicyclopentyl ether, dimethyl ether of diethylene glycol, diethyl ether of diethylene glycol and the like ethers of glycols; diphenyl ether, dibenzyl ether, dioxane, tetrahydrofuran, and the like hydrocarbons and ethers. In general, such diluents will contain up to and including about 20 carbon atoms in the hydrocarbon moieties. The liquid hydrocarbons particularly those having up to and including about 10 carbon atoms are preferred when such a solvent is employed. Such solvents are useful in amounts between about 1 to 100 parts per part by weight of the boron-halide amine complex.

In general, the operational techniques employed in conducting the process involve merely the addition of the boron halide, the aluminum metal, and the amine and then secondary solvent, if employed, to the reactor, then contacting with hydrogen under pressure at the designated conditions, and the reaction system is agitated. The amine-boron hydride product is recovered from the system by first filtering to remove excess aluminum, if employed, for recycling, then subjecting the residue to distillation at reduced pressure, if desired, driving off the amine-boron hydride complex. The by-product, aluminum halide-amine complex, can be recovered and reacted with a borate ester to form additional boron halide starting material and the corresponding aluminum alcoholate which can be hydrolyzed to form the corresponding alcohol which in turn can be reacted with boric acid, boric oxide or borax and sulfuric acid to produce additional borate ester.

The process of this invention will be further understood by reference to the following examples wherein all parts are by weight.

*Example I*

To a reactor equipped with internal agitation, external heating means, means for admitting and discharging reactants, and maintaining a gaseous pressure was added 100 parts of triethyl amine. Then 10 parts of boron trichloride were added thereto along with 5 parts of finely divided aluminum which had been previously activated by treating with 10 parts of triethyl aluminum and hydrogen at 140° C. and 1000 p.s.i. and filtering. The reactor was then heated to 220° C. and pressurized to 5000 p.s.i. with hydrogen. Agitation was commenced and these conditions were maintained for a period of 20 hours. The reaction mixture was then filtered and the filtrate subjected to vacuum distillation at room temperature and 5 mm. of mercury to remove, first, excess triethylamine and then the triethyl amine-borane product.

The yield of triethyl amine-borane product was 80 percent.

The following example illustrates an especially preferred embodiment, wherein triethylamine is employed as solvent with trimethyl amine-borontrichloride as the boron reactant. Higher yields are obtained with this type of system.

Example II

The procedure of Example I was repeated with the exception that 100 parts of triethylamine were employed as solvent, trimethylamine-borontrichloride was the boron chloride complex, and the reaction temperature was 180° C. for 20 hours. Triethylamine-borane complex was obtained in an 85 percent yield.

To illustrate the results obtained at temperatures lower than 180° C., the above example was repeated at 160° C. employing all other conditions the same. In this run, the yield of triethylamine-borane product was 30 percent with the remainder being a mixture of triethylamine-monochloro boron dihydride complex and triethylamine-dichloro boron hydride complex.

Example III

When 13.6 parts of boron trifluoride are reacted with 5.4 parts of finely divided aluminum, previously activated by treatment with HCl, in the presence of 100 parts of tri-n-octyl amine at 190° C. and a hydrogen pressure of 7500 p.s.i. for 10 hours, tri-n-octyl amine-borane complex is obtained in high yield.

Example IV

An essentially quantitative yield of pyridine-borane complex is obtained when 10 parts of boron tribromide are reacted with 5 parts of finely divided aluminum (byproduct from a previous run) at 180° C. and 2000 p.s.i. of hydrogen pressure for 10 hours in the presence of 50 parts of pyridine.

Example V

When Example I is repeated employing a reaction temperature of 100° C., the yield of triethylamine-borane is minor with the majority being a mixture of triethylamine-monochloro boron dihydride and triethylamine-dichloro boron monohydride.

Example VI

When Example I is repeated substituting dimethyl aniline, myristyl dimethylamine, tricyclohexyl amine, triphenyl amine, or trioctadecyl amine in place of triethylamine, the corresponding amine-borane complexes are obtained in high yield.

The above examples are presented by way of illustration and it is not intended that the invention be limited thereto. It will be evident that other boron halides and amines can be substituted if desired. For example, boron triiodide can be substituted in Examples I, III or IV to produce similar results.

In general, the reaction is conducted until no further pressure drop in the system is noted. Thus, there is no particular criticality in the time of the reaction although as the temperature is increased, shorter reaction times are required. Extensive contact time, as about 10 hours and longer, are not desirable at temperatures above about 220° C. because of decomposition of the product.

In order to further enhance the reaction rate, catalysts for the reaction can be employed. For this purpose, trialkyl aluminum or boron compounds, preferably having up to and including about 6 carbon atoms in each alkyl radical, and aluminum halides, particularly the chlorides, are well suited. When employed, the catalysts are preferably present in amount between about 1 to 5 percent by weight of the boron halide reactant. Thus, for example, the efficiency of Examples I and II (at 180° C.) above is further enhanced when triethylaluminum, triethylboron, or aluminum chloride are added to the reaction mixtures in the aforementioned amounts.

Since one of the constituents of the reaction mixture, namely the aluminum, is a solid, it is preferable to employ agitation to provide more intimate contact of the reactants. In general, the more vigorous agitation employed the better the reaction proceeds. Accordingly, turbulent agitation of the reaction mixture is preferred.

The mode of addition of the reactants can be varied. For example, the boron halide can be added to a mixture of the aluminum and the amine and the system pressurized with hydrogen or the aluminum can be added to a mixture of the boron halide in the amine, then any additional solvent, e.g. a hydrocarbon, can be added if desired. Other modifications in the process will be evident as, for example, bubbling the hydrogen reactant through the reaction mixture continuously under pressure and the like.

The principal reaction of the boron halide with aluminum and hydrogen is well suited to an integrated process whereby the aluminum halide-amine complex byproduct is treated to recover the halide value and the amine is to be used for further processing. In particular, the aluminum halide-amine complex can be treated with a borate ester, especially trialkyl borates having up to about 8 carbon atoms in each alkyl radical, to result in the formation of boron trihalide. Upon removal of the amine, the aluminum alcoholate by-product is separated by filtration. The aluminum alcoholate can then be hydrolyzed to produce the alcohol which is converted by reaction with boric acid, boric oxide, or borax and sulfuric acid to produce additional borate ester. The following example will demonstrate such an integrated process.

Example VII

Example I is repeated. At the completion of the reaction, the reaction mixture is filtered to remove excess aluminum which is recycled for reaction. Then the filtrate is subjected to distillation at room temperature and 10 mm. of mercury pressure to remove, as a first fraction, the triethylamine solvent. The temperature of the mixture is then increased to 100° C. wherein the amine-borane complex is distilled. The residue from the distillation operation is then treated with 10 parts of trimethyl borate at 100° C. for 2 hours. The resulting reaction mixture is then filtered to remove the boron trichloride which is employed as starting material in the principal reaction. The residue is hydrolyzed and filtered to collect the methanol as filtrate. The methanol is then reacted with boric oxide at reflux temperature for about 3 hours to form additional trimethyl borate for reuse.

The amine-borane complexes are of considerable utility. For example, they are readily converted to diborane by treatment with a boron halide such as boron trifluoride-etherate at room temperature. A still further use of the products obtained is as additives for diesel fuels. For example, when a minor amount of trimethylamine-borane is added to a diesel fuel, the cetane number of the fuel is enhanced. They are also useful as chemical intermediates to form other boron compounds and as reducing agents. These and other uses of the products produced will be evident to those skilled in the art.

Having thus described the process of this invention, it is not intended that it be limited except as set forth in the following claims.

I claim:

1. A process for the production of amine-borane complexes which comprises reacting together a mixture of activated aluminum metal, hydrogen and a tertiary amine complex of a boron halide, the tertiary amine of the complex being a hydrocarbon amine selected from the group consisting of alkyl, cycloalkyl, aryl, and heterocyclic tertiary amines which are liquid under the reaction conditions and contain up to and including about 18 carbon atoms in the hydrocarbon portions; said reaction being conducted at a temperature above about 100° C. but below the decomposition temperature of the desired amine-borane product; and said reaction being effected in an organic solvent which is liquid under the reaction conditions and is selected from the group consisting of (1) hydrocarbons which are inert to the reaction system, (2) hydrocarbon ethers which are inert to the reaction system, and (3) hydrocarbon tertiary amines selected from the class consisting of alkyl, cycloalkyl, aryl, and heterocyclic amines containing up to and including about 18 carbon atoms in the hydrocarbon portions.

2. The combination of claim 1 in which the reaction is carried out at a temperature between 180 and 220° C., and under a hydrogen pressure of from about 2000 to 7500 p.s.i.

3. The process of claim 2 wherein said activated aluminum is produced by contacting finely divided aluminum metal with an alkyl aluminum compound and with hydrogen at a temperature in the range of from about 120 to about 140° C. and at a pressure ranging from about 500 to about 1500 p.s.i.

4. The process of claim 2 wherein said activated aluminum is finely divided aluminum which was theretofore used in effecting said reaction.

5. A process for the manufacture of triethylamine-borane complex which comprises reacting at 180 to 220° C. in the liquid phase a mixture of liquid triethylamine, boron trichloride-trimethylamine complex, finely divided activated aluminum, and hydrogen at pressure of 2000 to 7500 p.s.i.

6. A process for the manufacture of triethylamine-borane complex which comprises reacting boron trichloride-trimethylamine with finely divided, activated aluminum, and hydrogen at 180 to 220° C. and a hydrogen pressure of 2000 to 7500 p.s.i. in the presence of triethylamine; said activated aluminum being selected from the group consisting of (a) aluminum produced by contacting finely divided aluminum metal with an alkyl aluminum compound and with hydrogen at a temperature in the range of from about 120 to about 140° C. and at a pressure ranging from about 500 to about 1500 p.s.i. and (b) finely divided aluminum which was theretofore used in effecting said reaction; there being present in said first named process between about 5 to 15 mole of the triethylamine per mole of said boron trichloride-trimethylamine, and an amount of said activated aluminum such that there is between about 10 to 100 percent excess thereof over the amount required to achieve complete reduction to the amine-borane.

7. A process for the production of amine-borane complexes which comprises reacting together a mixture of activated aluminum metal, hydrogen and a tertiary amine complex of a boron halide, the tertiary amine of the complex being a hydrocarbon amine selected from the group consisting of alkyl, cycloalkyl, aryl, and heterocyclic tertiary amines which are liquid under the reaction conditions and contain up to and including about 18 carbon atoms in the hydrocarbon portions; said reaction being conducted at a temperature above about 100° C. but below the decomposition temperature of the desired amine-borane product; and said reaction being effected in an organic solvent which is liquid under the reaction conditions, is separable from the desired amine-borane product by distillation, and is selected from the group consisting of (1) hydrocarbons which are inert to the reaction system, (2) hydrocarbon ethers which are inert to the reaction system, and (3) hydrocarbon tertiary amines selected from the class consisting of alkyl, cycloalkyl, aryl, and heterocyclic amines containing up to and including about 18 carbon atoms in the hydrocarbon portions, and distilling the amine-borane reaction product from the other volatilizable materials present in the reaction mixture.

References Cited in the file of this patent

UNITED STATES PATENTS 2,469,879    Hurd  ---------------- May 10, 1949

OTHER REFERENCES

Schlesinger et al.: Chemical Reviews, vol. 31, #1, page 1 (1942).

Schlesinger et al.: J. Am. Chem. Soc., vol. 62, page 3429 (1940).

Finholt et al.: J. Am. Chem. Soc., vol. 69, page 1202 (1947).

Schechter et al.: Boron Hydrides and Related Compounds, page 27 (1951, declassified 1953).

Zeeman: Chem. Abstracts, vol. 49, page 54 (1955).